US011509393B2

(12) United States Patent
Hori et al.

(10) Patent No.: US 11,509,393 B2
(45) Date of Patent: Nov. 22, 2022

(54) OPTICAL WIRELESS TRANSMISSION SYSTEM

(71) Applicant: NEC Corporation, Tokyo (JP)

(72) Inventors: Shinichi Hori, Tokyo (JP); Yuma Kase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/171,131

(22) Filed: Feb. 9, 2021

(65) Prior Publication Data

US 2022/0149939 A1    May 12, 2022

(30) Foreign Application Priority Data

Feb. 12, 2020   (JP) .............................. JP2020-021544

(51) Int. Cl.

| | |
|---|---|
| H04B 10/2575 | (2013.01) |
| H04B 10/516 | (2013.01) |
| H04B 10/11 | (2013.01) |
| H04L 7/00 | (2006.01) |
| H04B 10/548 | (2013.01) |
| H04B 10/54 | (2013.01) |
| H04B 10/556 | (2013.01) |

(52) U.S. Cl.
CPC ......... H04B 10/11 (2013.01); H04B 10/2575 (2013.01); H04B 10/25758 (2013.01); H04B 10/516 (2013.01); H04B 10/541 (2013.01); H04B 10/548 (2013.01); H04B 10/5561 (2013.01); H04L 7/0075 (2013.01)

(58) Field of Classification Search
CPC ..................................... H04B 10/2575–25758

USPC ................................................... 398/115–117
See application file for complete search history.

(56) References Cited

U.S. PATENT DOCUMENTS

| 4,706,300 A | * | 11/1987 | Minemura ................ G01J 9/04 |
| | | | 398/204 |
| 5,777,771 A | * | 7/1998 | Smith ...................... H04K 1/00 |
| | | | 398/182 |

(Continued)

FOREIGN PATENT DOCUMENTS

| CN | 110176934 A | * | 8/2019 | ........... H04B 1/0021 |
| JP | 2005-079855 A | | 3/2005 | |

(Continued)

*Primary Examiner* — Li Liu
(74) *Attorney, Agent, or Firm* — Sughrue Mion, PLLC

(57) ABSTRACT

An optical wireless transmission system 10 includes a transmission device including at least one memory storing instructions, and at least one processor configured to execute the instructions to; generate a plurality of digital outphasing signals; orthogonally modulate the digital outphasing signals at an intermediate frequency; and set an intermediate frequency for satisfying a specified signal-to-distortion power ratio based on a sampling frequency, wherein the digital outphasing signals are orthogonally modulated at the intermediate frequency; a hardware optical fiber module configured to convert orthogonally modulated digital electrical signals into optical signals, transmit the optical signals through an optical fiber, and convert the optical signals into digital electrical signals; and a remote unit configured to combine the digital electrical signals transmitted by the hardware optical fiber module, and transmit a combined signal as a radio signal.

10 Claims, 15 Drawing Sheets

(56) References Cited

U.S. PATENT DOCUMENTS

| | | | | |
|---|---|---|---|---|
| 5,990,734 | A * | 11/1999 | Wright | H03F 1/0294 330/149 |
| 6,054,894 | A * | 4/2000 | Wright | H03F 1/3247 330/149 |
| 2002/0047745 | A1* | 4/2002 | Kolanek | H03F 1/0294 330/149 |
| 2002/0144280 | A1* | 10/2002 | Matsuura | H03D 7/161 725/111 |
| 2004/0053644 | A1* | 3/2004 | Matsuyoshi | H04W 88/08 455/561 |
| 2005/0036789 | A1* | 2/2005 | Bjorndahl | H04B 10/801 398/118 |
| 2006/0067425 | A1* | 3/2006 | Windisch | H04B 1/0475 375/296 |
| 2006/0072876 | A1* | 4/2006 | Kikushima | H04B 10/66 385/31 |
| 2008/0063397 | A1* | 3/2008 | Hu | H04J 14/0282 398/43 |
| 2008/0145056 | A1* | 6/2008 | Boldi | H04J 14/0283 398/79 |
| 2010/0226304 | A1* | 9/2010 | Shoji | H04B 1/40 370/329 |
| 2012/0039603 | A1* | 2/2012 | Wiegner | H04W 28/12 398/43 |
| 2012/0328301 | A1* | 12/2012 | Gupta | H04B 10/5561 398/116 |
| 2017/0170838 | A1* | 6/2017 | Pagnanelli | H03F 3/2175 |
| 2017/0180053 | A1* | 6/2017 | Lozhkin | H04B 10/564 |
| 2018/0139802 | A1* | 5/2018 | Hori | H04W 88/085 |
| 2019/0166602 | A1* | 5/2019 | Sung | H04B 10/25752 |
| 2019/0238152 | A1* | 8/2019 | Pagnanelli | H03M 3/436 |
| 2021/0384976 | A1* | 12/2021 | Torfs | H04W 88/085 |

FOREIGN PATENT DOCUMENTS

| | | | |
|---|---|---|---|
| JP | 2005079855 | A * | 3/2005 |
| JP | 5450795 | B2 | 3/2014 |

* cited by examiner

OPTICAL WIRELESS TRANSMISSION SYSTEM

INCORPORATION BY REFERENCE

This application is based upon and claims the benefit of priority from Japanese patent application No. 2020-021544, filed on Feb. 12, 2020, the disclosure of which is incorporated herein in its entirety by reference.

TECHNICAL FIELD

The present disclosure relates to an optical wireless transmission system, an optical wireless transmission method, and a non-transitory computer readable medium.

BACKGROUND ART

In an access network of a mobile network, a system that supplies radio waves at low cost is under review for a fringe area such as in an underground shopping mall or in a building where radio waves from an outdoor base station are hard to reach. As such a system, an optical wireless transmission system using an optical fiber, such as disclosed in Japanese Unexamined Patent Application Publication No. 2005-79855 and Japanese Patent No. 5450795, is disposed.

However, the optical wireless transmission systems disclosed in Japanese Unexamined Patent Application Publication No. 2005-79855 and Japanese Patent No. 5450795 have a problem that the configuration of a transmission device is complicated. To be specific, modulation using a special analog circuit for generating an outphasing signal is required, which leads to significant cost-up of the transmission device.

SUMMARY

One example of objects of the present disclosure is to provide an optical wireless transmission system, an optical wireless transmission method, and a non-transitory computer readable medium capable of simplifying a device configuration in view of the problems described above.

An optical wireless transmission system according to one example aspect of the disclosure includes a transmission device including at least one memory storing instructions, and at least one processor configured to execute the instructions to; generate a plurality of digital outphasing signals; orthogonally modulate the digital outphasing signals at an intermediate frequency; and set an intermediate frequency for satisfying a specified signal-to-distortion power ratio based on a sampling frequency, wherein the digital outphasing signals are orthogonally modulated at the intermediate frequency; a hardware optical fiber module configured to convert orthogonally modulated digital electrical signals into optical signals, transmit the optical signals through an optical fiber, and convert the optical signals into digital electrical signals; and a remote unit configured to combine the digital electrical signals transmitted by the hardware optical fiber module, and transmit a combined signal as a radio signal.

An optical wireless transmission method according to one example aspect of the disclosure includes generating a plurality of digital outphasing signals; orthogonally modulating the digital outphasing signals at an intermediate frequency; setting an intermediate frequency for satisfying a specified signal-to-distortion power ratio based on a sampling frequency, wherein the orthogonal modulation orthogonally modulates the digital outphasing signals at the set intermediate frequency; converting orthogonally modulated digital electrical signals into optical signals, transmitting the optical signals through an optical fiber, and converting the optical signals into digital electrical signals; and combining the transmitted digital electrical signals and transmitting a combined signal as a radio signal.

A non-transitory computer readable medium according to one example aspect of the disclosure stores a program causing a computer to perform a method of: generating a plurality of digital outphasing signals; orthogonally modulating the digital outphasing signals at an intermediate frequency; and setting an intermediate frequency for satisfying a specified signal-to-distortion power ratio based on a sampling frequency, wherein the orthogonal modulation orthogonally modulates the digital outphasing signals at the set intermediate frequency.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

Specific example embodiments of the present disclosure are described hereinafter in detail with reference to the drawings. The present disclosure, however, is not limited to the below-descried example embodiments. Further, the following description and the attached drawings are appropriately shortened and simplified to clarify the explanation. In the figures, the identical reference symbols denote identical structural elements and the redundant explanation thereof is omitted.

Example embodiments of the present disclosure are described hereinafter with reference to the drawings.

First Example Embodiment

Figure 1:
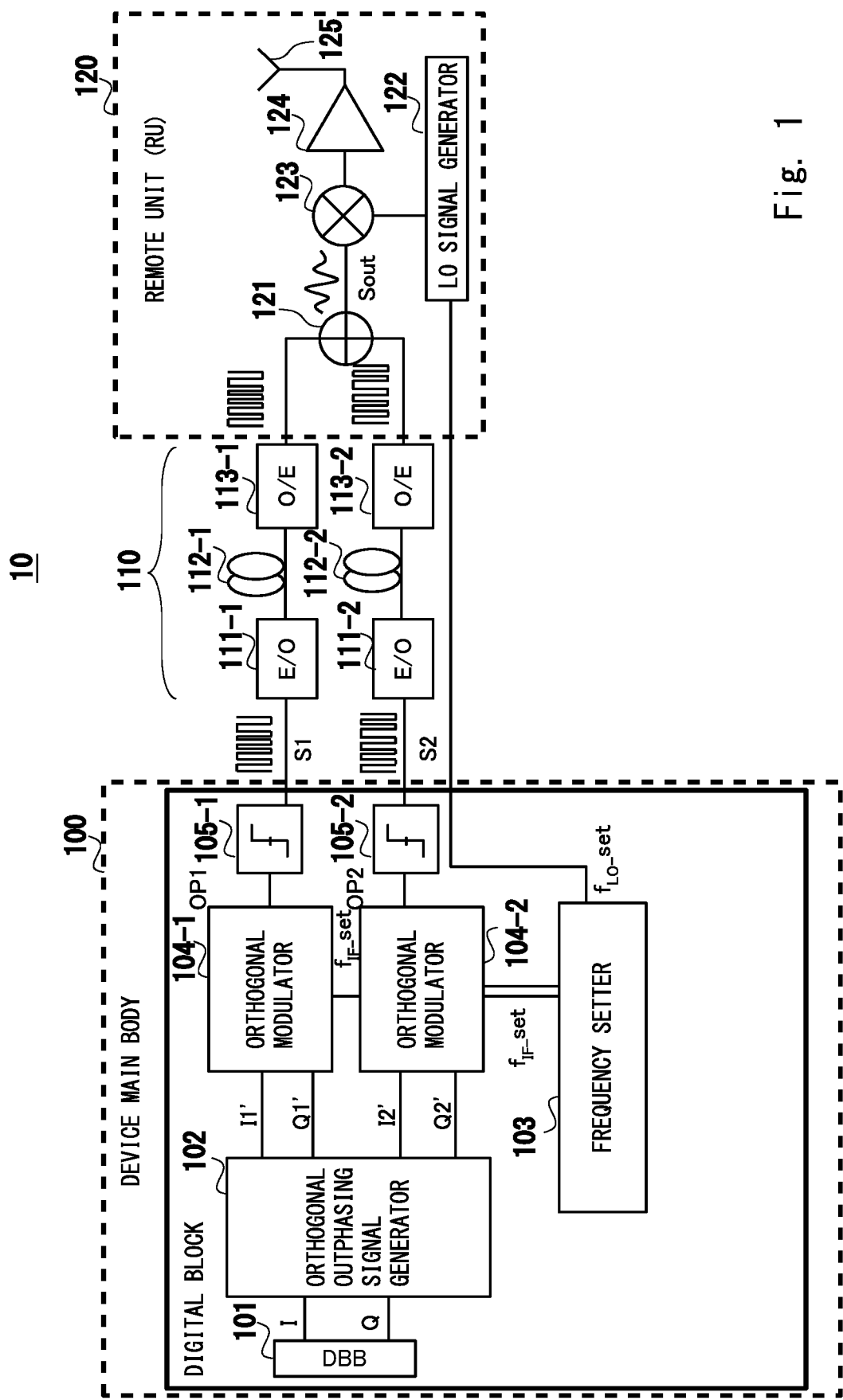
FIG. 1 is a block diagram showing an example of an optical wireless transmission system according to a first example embodiment.

FIG. 1 is a block diagram showing an example of an optical wireless transmission system according to a first example embodiment. In FIG. 1, an optical wireless transmission system 10 includes a transmission device 100, an optical fiber module 110, and a remote unit 120.

The transmission device 100 includes a digital baseband signal processor (DBB) 101, an orthogonal outphasing signal generator 102, a frequency setter 103, an orthogonal modulator 104-1, an orthogonal modulator 104-2, a rectangulating unit 105-1, and a rectangulating unit 105-2.

The digital baseband signal processor 101 generates two orthogonal radio signals I and Q. The digital baseband signal processor 101 outputs the orthogonal radio signals I and Q to the orthogonal outphasing signal generator 102. The orthogonal radio signals I and Q are electrical signals with baseband frequencies orthogonal to each other.

The orthogonal outphasing signal generator 102 generates two sets of orthogonal outphasing signals I1' and Q1', and I2' and Q2', based on which an outphasing signal is generated, from the orthogonal radio signals I and Q. The orthogonal outphasing signal generator 102 then outputs the signals I1' and Q1' to the orthogonal modulator 104-1. The orthogonal outphasing signal generator 102 further outputs the signals I2' and Q2' to the orthogonal modulator 104-2.

The frequency setter 103 controls an intermediate frequency $f_{IF}$. To be specific, the frequency setter 103 gives an indication of the set intermediate frequency $f_{IF}$ to the orthogonal modulator 104-1 and the orthogonal modulator 104-2. Further, the frequency setter 103 generates an LO adjustment signal that controls the frequency of a local signal (LO signal) generated by an LO signal generator in a remote unit. To be specific, the frequency setter 103 gives an indication of the set frequency of the local signal to an LO signal generator 122 in the remote unit 120. Since the LO adjustment signal is sufficiently slower than a radio signal, a metal line such as a coaxial cable or an optical module may be used as a transmission medium for the LO adjustment signal from the transmission device 100 to the remote unit 120.

The details of this control are described later.

The orthogonal modulator 104-1 orthogonally modulates one set of the input orthogonal radio signals I1' and Q1' at the intermediate frequency $f_{IF}$. The orthogonal modulator 104-1 then outputs an orthogonally modulated signal OP1 to the rectangulating unit 105-1. The output signal OP1 of the orthogonal modulator 104-1 is defined by the following equation (1)

$$OP1=\cos \omega_{IF} t \cdot I1' + \sin \omega_{IF} t \cdot Q1' \quad (1)$$

where $\omega_{IF}$ is the angular frequency obtained by multiplying the intermediate frequency $f_{IF}$ by $2\pi$.

Likewise, the orthogonal modulator 104-2 orthogonally modulates one set of the input orthogonal radio signals I2' and Q2' at the intermediate frequency $f_{IF}$. The orthogonal modulator 104-2 then outputs an orthogonally modulated signal OP2 to the rectangulating unit 105-2. The output signal OP2 is defined by the following equation (1-2).

$$OP2=\cos \omega_{IF} t \cdot I2' + \sin \omega_{IF} t \cdot Q2' \quad (1-2)$$

The rectangulating unit 105-1 converts the input signal OP1 into a rectangular shape by zero comparison. The rectangulating unit 105-1 then outputs a rectangular signal S1 to an E/O converter 111-1. Likewise, the rectangulating unit 105-2 converts the input signal OP2 into a rectangular shape by zero comparison. The rectangulating unit 105-2 then outputs a rectangular signal S2 to an E/O converter 111-2.

All of the circuit blocks that constitute the above-described transmission device 100 are implemented as digital circuits, and they operate in synchronization with a clock signal.

The configuration of the optical fiber module 110 is described hereinafter. The optical fiber module 110 is a hardware component and includes the E/O converter 111-1, the E/O converter 111-2, an optical fiber 112-1, an optical fiber 112-2, an O/E converter 113-1, and an O/E converter 113-2.

The E/O converter 111-1 converts the signal S1, which is an electrical signal, into an optical signal. The E/O converter 111-1 then transmits the optical signal to the O/E converter 113-1 through the optical fiber 112-1.

The E/O converter 111-2 converts the signal S2, which is an electrical signal, into an optical signal. The E/O converter 111-2 then transmits the optical signal to the O/E converter 113-2 through the optical fiber 112-2.

The O/E converter 113-1 converts the optical signal transmitted from the E/O converter 111-1 into an electrical signal. The O/E converter 113-1 then outputs the converted electrical signal to a combiner 121 of the remote unit 120.

The O/E converter 113-2 converts the optical signal transmitted from the E/O converter 111-2 into an electrical signal. The O/E converter 113-2 then outputs the converted electrical signal to the combiner 121 of the remote unit 120.

The remote unit 120 includes the combiner 121, the LO signal generator 122, a mixer circuit 123, a power amplifier 124, and an antenna 125.

The combiner 121 combines the electrical signal transmitted from the O/E converter 113-1 and the electrical signal transmitted from the O/E converter 113-2. The combiner 121 then outputs the combined signal to the mixer circuit 123.

The LO signal generator 122 generates a local signal with the frequency indicated by the frequency setter 103. The LO signal generator 122 then outputs the local signal to the mixer circuit 123.

The mixer circuit 123 mixes the local signal with the signal combined by the combiner 121 and thereby performs frequency conversion. The mixer circuit 123 then outputs the frequency-converted signal to the power amplifier 124. In the mixer circuit 123, the frequency of the output signal is equal to the sum of, or a difference between, the frequency of the input signal and the frequency of the LO signal. The frequency of the LO signal can be controlled by the LO adjustment signal from the frequency setter 103.

The power amplifier 124 amplifies the signal after frequency conversion in the mixer circuit 123. The power amplifier 124 then outputs the amplified signal to the antenna 125.

The antenna 125 emits the output of the power amplifier 124 as a radio wave in the air.

The operation of the optical wireless transmission system 10 shown in FIG. 1 is described hereinbelow.

First, the digital baseband signal processor 101 in the transmission device 100 generates orthogonal radio signals I(t) and Q(t). The orthogonal radio signals I(t) and Q(t) are defined by the following equations (2) and (3) by using an amplitude signal A(t) and a phase signal θ(t).

$$I(t) = A(t)\cos\theta(t) \quad (2)$$

$$Q(t) = A(t)\sin\theta(t) \quad (3)$$

Note that the following equations (4) and (5) are also established.

$$A(t) = \sqrt{I(t)^2 + Q(t)^2} \quad (4)$$

$$\theta(t) = \operatorname{Arctan}(Q(t)/I(t)) \quad (5)$$

Then, from the orthogonal radio signals I(t) and Q(t), the orthogonal outphasing signal generator 102 generates orthogonal outphasing signals I1'(t) and Q1'(t), and I2'(t) and Q2'(t) according to the following equations (6) to (10).

$$I1'(t) = \cos(\theta(t) + \theta amp(t)) \quad (6)$$

$$Q1'(t) = \sin(\theta(t) + \theta amp(t)) \quad (7)$$

$$I2'(t) = \cos(\theta(t) - \theta amp(t)) \quad (8)$$

$$Q2'(t) = \sin(\theta(t) - \theta amp(t)) \quad (9)$$

$$\theta amp(t) = \operatorname{Arccos}(A(t)/2) \quad (10)$$

In the two orthogonal modulators 104-1 and 104-2, I1' and Q1' are input to the orthogonal modulator 104-1, and I2' and Q2' are input to the orthogonal modulator 104-2. Then, the two orthogonal modulators 104-1 and 104-2 output outphasing signals OP1 and OP2, respectively.

An output OP1(t) of the orthogonal modulator 104-1 is a signal with a constant amplitude that is defined by the following equation (11). The equation (11) is obtained by substituting the right-hand side of the equation (6) into I1' and substituting the right-hand side of the equation (7) into Q1' in the equation (1).

$$OP1(t) = \cos(\omega_{IF} \cdot t - \theta(t) - \theta amp(t)) \quad (11)$$

Likewise, an output OP2(t) of the orthogonal modulator 104-2 is a signal with a constant amplitude that is defined by the following equation (12). The equation (12) is obtained by substituting the right-hand side of the equation (8) into I2' and substituting the right-hand side of the equation (9) into Q2' in the equation (1-2).

$$OP2(t) = \cos((\omega_{IF} \cdot t - 0(t) + \theta amp(t)) \quad (12)$$

Note that the sum of OP1 and OP2 is an intermediate frequency signal IF(t) as indicated by the following equation (13).

$$IF(t) = A(t)\cos(\omega_{IF} \cdot t - \theta(t)) \quad (13)$$

The right-hand side of the above equation is a general expression of a radio signal whose amplitude signal is the amplitude signal A(t), whose phase signal is the phase signal θ(t), and whose carrier frequency is the intermediate frequency $f_{IF}$. Further, it corresponds to the equation obtained by substituting I(t) and Q(t) into I1' and Q1', respectively, in the relational expression of input and output of the orthogonal modulator defined by the equation (1).

As described above, the signal OP1 and the signal OP2 are signals with a constant amplitude. By summing the signals OP1 and OP2, this signal matches a signal obtained by orthogonal modulation of the orthogonal radio signals I(t) and Q(t).

The rectangulating units 105-1 and 105-2 receive the outphasing signals OP1 and OP2, respectively, and output respectively 1 when the value of the outphasing signals OP1, OP2 is greater than 0, and output respectively −1 when it is smaller than 0. Note that, when the value of the outphasing signal OP1, OP2 is 0, they output either 1 or −1, which can be determined arbitrarily. Specifically, each of output signals S1(t) and S2(t) of the rectangulating units 105-1 and 105-2 is a binary digital signal of 1 or −1.

Rectangular outphasing signals S1 and S2, which are outputs of the rectangulating units 105-1 and 105-2, respectively, are defined by the following equations (13) and (14)

$$S1(t) = OP1(t) + Rec(OP1(t)) \quad (13)$$

$$S2(t) = OP2(t) + Rec(OP2(t)) \quad (14)$$

where the functions Rec(OP1(t)) and Rec(OP2(t)) are signal distortion components generated by rectangulation, and they correspond to a difference between the output signal and the input signal of the rectangulating unit 105-1 or 105-2, respectively.

The rectangular outphasing signals S1 and S2 are transmitted to the remote unit 120 through the optical fiber module 110. In the remote unit 120, the combiner 121 outputs the sum of S1 and S2, which are input signals. An output signal Scomb(t) is defined by the following equation (15).

$$Scomb(t) = S1(t) + S2(t) = OP1(t) + OP2(t) + Rec(OP1(t)) + Rec(OP2(t)) \quad (15)$$

In the right-hand side of the equation (15), the sum of OP1 and OP2 is the intermediate frequency signal IF(t) as indicated by the equations (11), (12) and (13). Thus, Scomb(t) contains the intermediate frequency signal IF(t), which is a desired component, as indicated by the following equation (16).

$$Scomb(t) = IF(t) + Rec(OP1(t)) + Rec(OP2(t)) \quad (16)$$

The output signal of the mixer circuit 123, to which Scomb(t) is input, contains the following two frequency components when the frequency of an external LO signal is $f_{LO}$.

$$f_{LO} + f_{IF}$$

$$f_{LO} - f_{IF}$$

Any one of the above-described two frequency components is selected by using a filter or the like. Then, the selected frequency component is emitted from the antenna 125.

When a target value of the frequency of a radio signal emitted from the antenna 125 is $f_{DES}$, the frequency $f_{LO}$ of the external LO signal needs to be set to $f_{DES} - f_{IF}$ or $f_{DES} + f_{IF}$.

The frequency setter 103 of the transmission device 100 sets the intermediate frequency $f_{IF}$ to be used in the orthogonal modulator 104-1 and 104-2 so that the signal-to-distortion characteristics have a specified value or greater as described below. Then, concurrently with this setting, the frequency setter 103 sets the frequency $f_{LO}$ of the external LO signal so that the frequency of the radio signal emitted from the antenna 125 becomes the target value.

Figure 2:
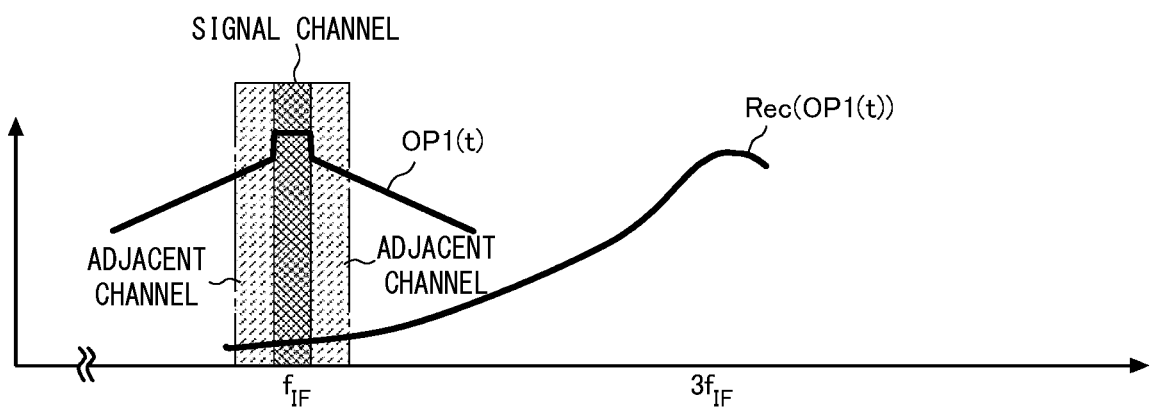
FIG. 2 shows spectra of OP1($t$) and Rec(OP1($t$)).

Signal distortion is described hereinafter with reference to FIG. 2. FIG. 2 is the spectra of OP1(t) and Rec(OP1(t)). In FIG. 2, the vertical axis indicates the signal strength, and the horizontal axis indicates the frequency.

As described earlier, OP1(t) is the outphasing signal, and it is considered as a desired signal. On the other hand, Rec(OP1(t)) is a signal distortion that occurs when rectangulation is done in the rectangulating unit 105-1, and it is considered as an undesired signal. Generally, when rectangulation is performed, a distortion occurs at a frequency that is approximately odd number times the frequency band occupied by a signal before rectangulation. Particularly, a significant distortion component occurs at a frequency that is approximately three times higher.

Rec(OP1(t)) is a broadband component that peaks at a frequency of approximately three times higher than $f_{IF}$, and it spreads widely to near $f_{IF}$, which is a desired band. Further, as the signal band before rectangulation is wider, this distortion component spreads over a wide range with a higher strength, and the strength in a signal channel and an adjacent channel band also becomes higher.

Figure 3:
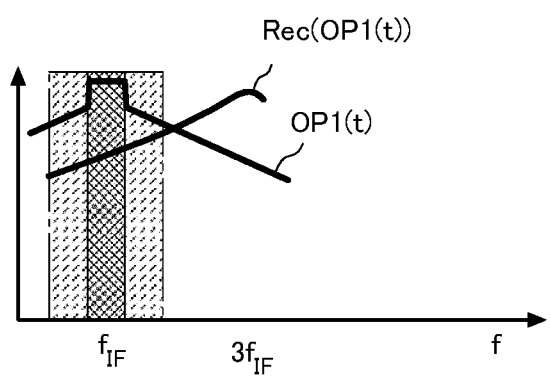
FIG. 3 show spectra in the case where an intermediate frequency $f_{IF}$ set by a frequency setter 103 is set lower than in the case of FIG. 2.

FIG. 3 show spectra in the case where the intermediate frequency $f_{IF}$ set by the frequency setter 103 is set lower than in the case of FIG. 2. In FIG. 3, the vertical axis indicates the signal strength, and the horizontal axis indicates the frequency.

As shown in FIG. 3, for a signal in the same band, when $f_{IF}$ is set low, the peak of Rec(OP1(t)) approaches $f_{IF}$, and the component of this Rec(OP1(t)) in a desired channel and an adjacent channel increases.

Figure 4:
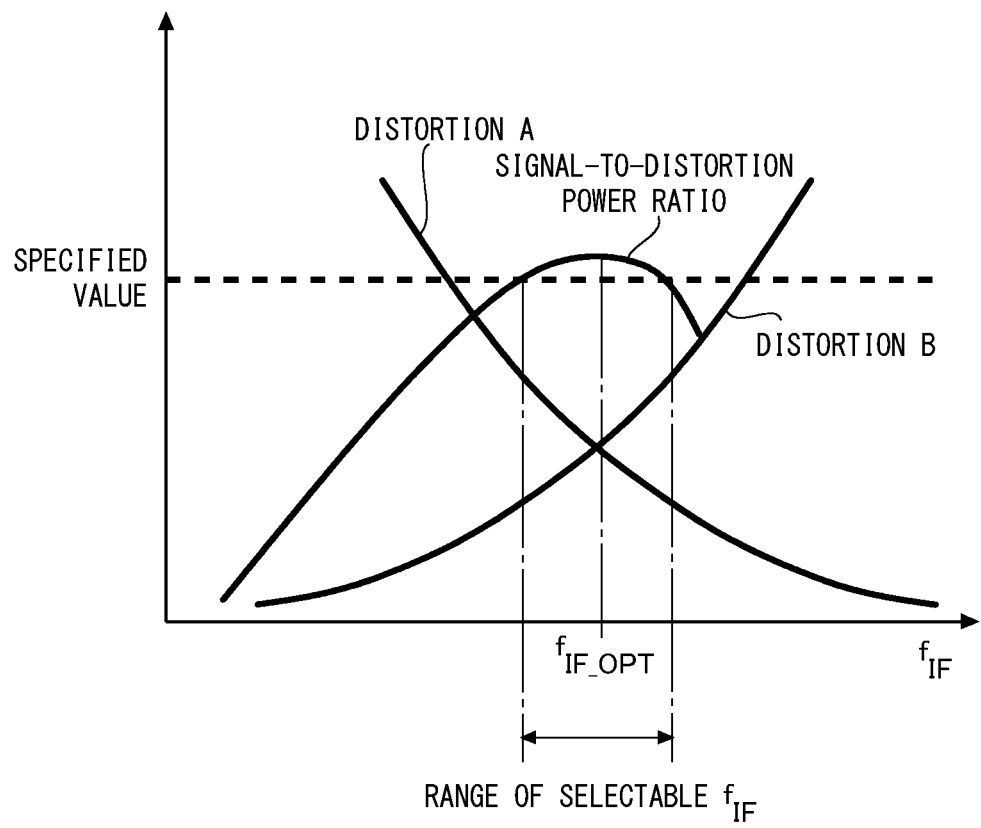
FIG. 4 is a graph plotting the amount of distortion and a signal-to-distortion power ratio in a desired band when the intermediate frequency $f_{IF}$ set by the frequency setter 103 is changed.

FIG. 4 is a graph plotting the amount of distortion and the signal-to-distortion power ratio in a desired band when the intermediate frequency $f_{IF}$ set by the frequency setter 103 is changed. The distortion A in FIG. 4 is the strength of Rec(OP1(t)) in a desired band, and it becomes larger as $f_{IF}$ is set lower.

Figure 5:
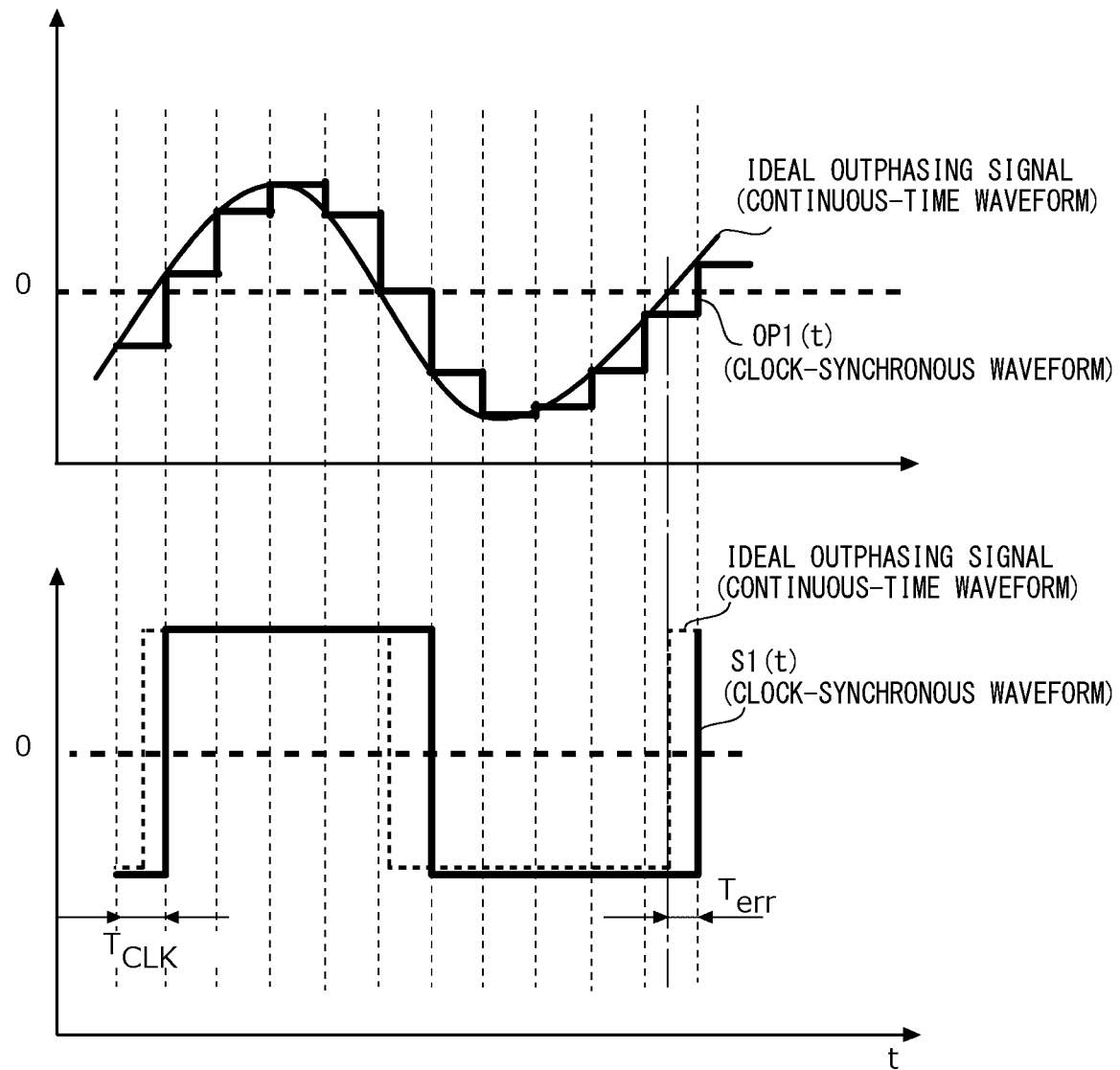
FIG. 5 is a graph showing an input signal and an output signal of a rectangulating unit.

Signal processing of the rectangulating unit 105-1 is described hereinafter with reference to FIG. 5. FIG. 5 is a graph showing an input signal and an output signal of the rectangulating unit. In FIG. 5, the vertical axis indicates the voltage value of a signal, and the horizontal axis indicates time. FIG. 5 shows the time waveform of an outphasing signal OP1(t) and a rectangular outphasing signal S1(t), which are the input and output signals of the rectangulating unit 105-1. Since the transmission device 100 operates in synchronization with a clock signal, the values of OP1(t) and S1(t) are updated in synchronization with a clock edge. Note that a clock frequency is denoted by $f_{CLK}$, and a clock cycle, which is the inverse of $f_{CLK}$, is denoted by $T_{CLK}$. Further, as ideal waveforms, an ideal outphasing signal and an ideal rectangular outphasing signal in continuous time are shown overlapping with OP1(t) and S1(t), respectively. A continuous-time waveform is the same as a waveform where the clock frequency is set infinitely high. OP1(t) and S1(t) are the same as the waveforms where the corresponding ideal waveforms are sampled with zero-order hold.

In the waveforms of S1(t) and the ideal rectangular outphasing signal, a time difference at a high/low transition point is $T_{err}$. Considering that S1(t) is the waveform obtained by sampling the ideal rectangular outphasing signal with zero-order hold, $T_{err}$ is a value equal to or more than 0 and less than $T_{CLK}$. Further, regarding a possible value of $T_{err}$, since the probability density function is considered to be constant, the average value is $T_{CLK}/2$, which is an intermediate value between 0 and $T_{CLK}$. Further, since the carrier frequency of S1 is the intermediate frequency $f_{IF}$, a phase distortion that occurs in the rectangulating unit 105-1 is approximately $2\pi \cdot f_{IF} \cdot T_{CLK}/2$. Thus, the phase distortion increases as $f_{IF}$ becomes higher. In FIG. 4, this amount of distortion is plotted as the distortion B.

As shown in FIG. 4, the distortion A and the distortion B exhibit opposite dependence on $f_{IF}$. To be specific, the distortion A increases as $f_{IF}$ becomes lower, and the distortion B increases as $f_{IF}$ becomes higher. Thus, the signal-to-distortion power ratio is small when $f_{IF}$ is significantly low where the distortion A is dominant, and it is small when $f_{IF}$ is significantly high where the distortion B is dominant. Therefore, regarding $f_{IF}$, there is an intermediate value $f_{IF\_OPT}$ at which the signal-to-distortion power ratio is maximum.

The above-described frequency setter 103 selects $f_{IF}$, including $f_{IF\_OPT}$, at which the signal-to-distortion power ratio that is equal to or greater than a predetermined value is obtained in the transmission device 100.

The relationship between the amount of the distortions A and B and the signal-to-distortion power ratio can be calculated by theoretical analysis or simulation analysis if parameters are given. Those parameters may be the type of a radio signal (LTE, 5GNR, WiFi, etc.) used, a signal bandwidth, a clock frequency supplied to the transmission device, an intermediate frequency, and the like. Having a table of those parameters and the signal-to-distortion power ratio, the frequency setter 103 is able to select the intermediate frequency at which the signal-to-distortion power ratio is equal to or greater than a predetermined value.

As described above, according to the optical wireless transmission system of the first example embodiment, outphasing signals are achieved totally by a digital circuit configuration, and therefore not only the remote unit but also the transmission device does not need to include an analog block including a digital-to-analog converter (DAC). This result contributes to simplify the device configuration and thereby achieves low cost and high efficiency (low power consumption). Further, the intermediate frequency at which the signal-to-distortion power ratio is equal to or greater than a predetermined value is selectable by the frequency setter.

Further, in the optical wireless transmission system according to the first example embodiment, a digital baseband signal generated in the transmission device is converted from parallel to serial and then transmitted to the remote unit located in a fringe area through the optical fiber. After that, in the remote unit, the signal is converted from serial to parallel, converted from digital to analog, and converted at a high frequency, and then emitted from the antenna. In the optical wireless transmission system according to the first example embodiment, by placing the transmission device in a concentrator, a network device to be placed in a fringe area such as in an underground shopping mall can be a small size and lightweight remote unit. This leads to advantages such as installation at relatively many locations and reduction of space rental cost and construction cost.

Second Example Embodiment

Figure 6:
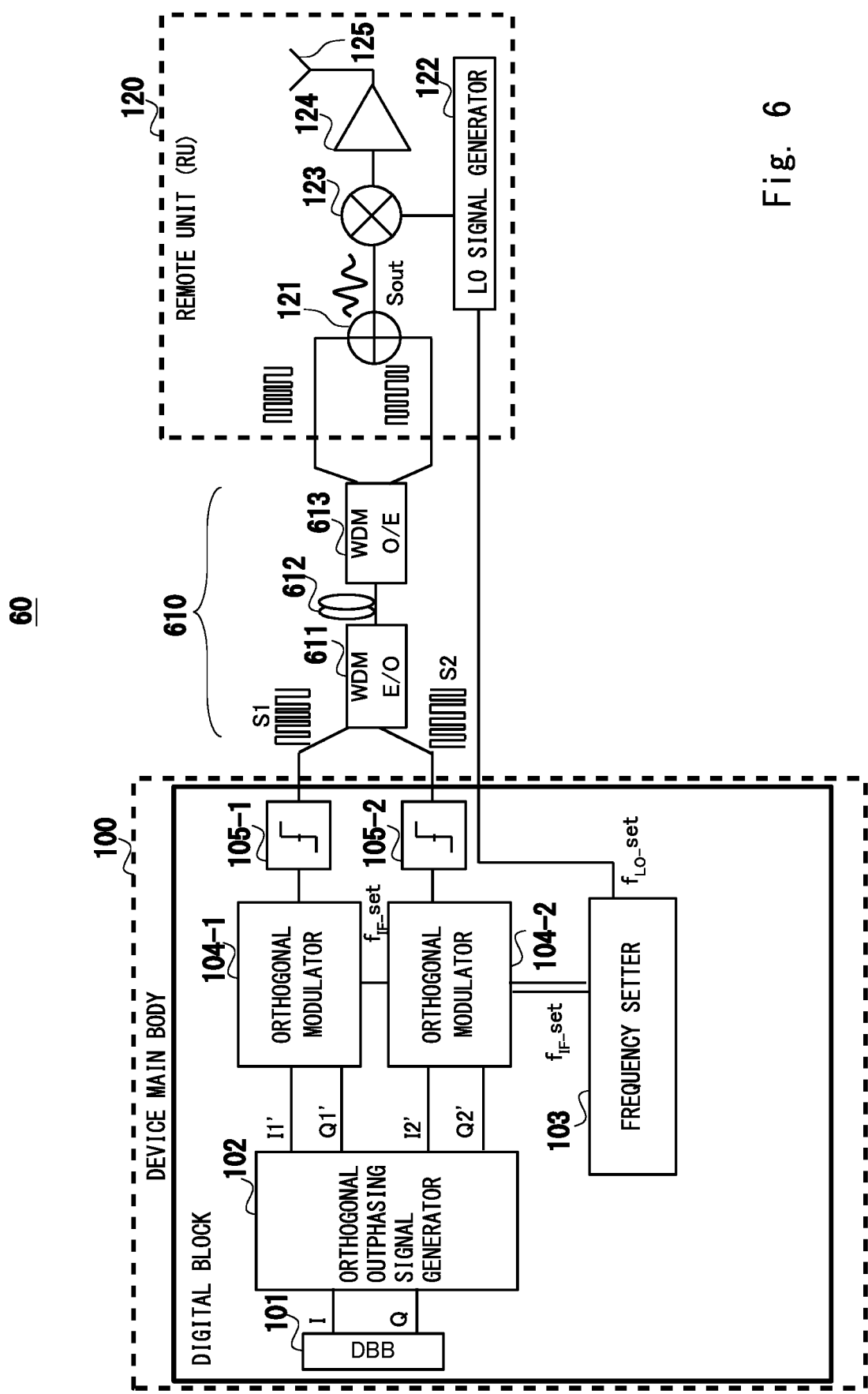
FIG. 6 is a block diagram showing an example of an optical wireless transmission system according to a second example embodiment.

In a second example embodiment, an example of performing wavelength-division multiplexing on a plurality of electrical signal with optical signals with different wavelengths is described. FIG. 6 is a block diagram showing an example of an optical wireless transmission system according to the second example embodiment. In FIG. 6, the same elements as in FIG. 1 are denoted by the same reference numerals and the description thereof is omitted. In FIG. 6, an optical wireless transmission system 60 includes a transmission device 100, a wavelength-division multiplexing optical fiber module 610, and a remote unit 120.

The wavelength-division multiplexing optical fiber module 610 includes a wavelength-division multiplexing E/O converter 611, one optical fiber 612, and a wavelength-division multiplexing O/E converter 613.

The wavelength-division multiplexing E/O converter 611 receives a plurality of electrical signals, converts the electrical signals into optical signals with different wavelengths, and then outputs them to one optical fiber 612. In other words, the wavelength-division multiplexing E/O converter 611 converts the electrical signals from the rectangulating unit 105-1 and the rectangulating unit 105-2 into optical signals with different wavelengths from each other. The wavelength-division multiplexing E/O converter 611 then outputs the optical signals to the one optical fiber 612.

The wavelength-division multiplexing O/E converter 613 divides, by wavelength, the plurality of optical signals with different wavelengths transmitted from the one optical fiber 612 and outputs each signal as an electrical signal.

In the second example embodiment, the rectangular outphasing signals S1 and S2 generated in the transmission device 100 are transmitted to the remote unit 120 through the wavelength-division multiplexing optical fiber module 610. Further, the LO adjustment signal generated in the frequency setter 103 of the transmission device 100 is transmitted from the transmission device to the remote unit through a metal line such as a coaxial cable or the wavelength-division multiplexing optical fiber module 610 in the same manner as in the first example embodiment.

As described above, according to the optical wireless transmission system of the second example embodiment, the rectangular outphasing signals S1 and S2 are transmitted through one optical fiber between the transmission device and the remote unit. Since two optical fibers are needed in the first example embodiment, the number of optical fibers is reduced in the second example embodiment. As a result, the optical wireless transmission system according to the second example embodiment contributes to reduction of cable wire cost and wiring work cost.

Third Example Embodiment

Figure 7:
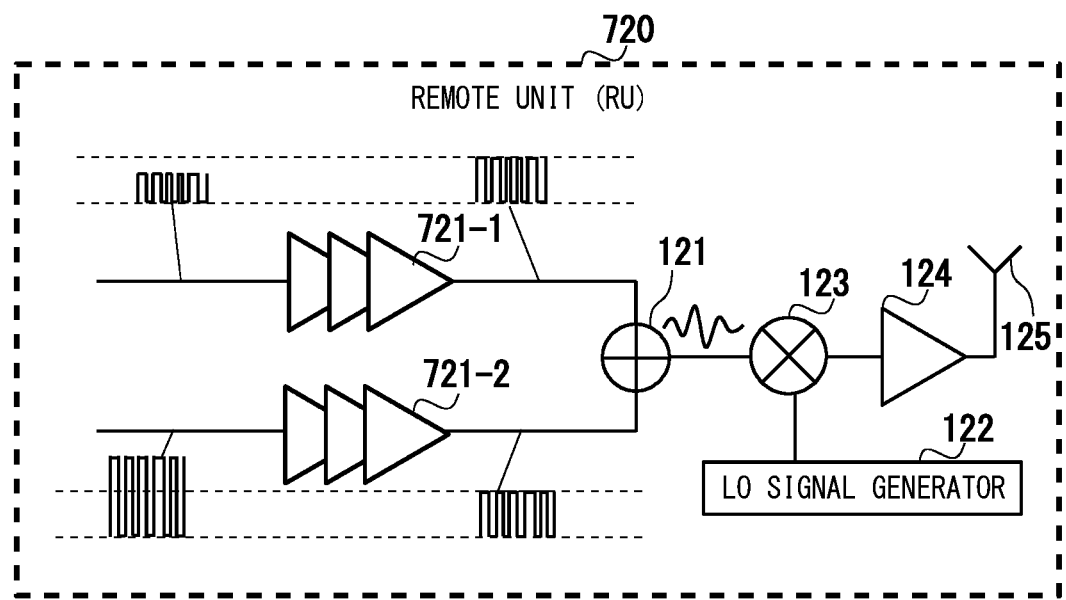
FIG. 7 is a block diagram showing an example of a remote unit according to a third example embodiment.

In a third example embodiment, an example of the remote unit of the optical wireless transmission system according to the first or second example embodiment is described. FIG. 7 is a block diagram showing an example of a remote unit according to the third example embodiment. In FIG. 7, a remote unit 720 includes a limiter amplifier 721-1, a limiter amplifier 721-2, a combiner 121, an LO signal generator 122, a mixer circuit 123, a power amplifier 124, and an antenna 125.

The limiter amplifier 721-1 converts the amplitude level of a rectangular signal as an output signal into a specified value without depending on the amplitude level of an input rectangular signal. The limiter amplifier 721-1 then outputs the converted rectangular signal to the combiner 121.

Likewise, the limiter amplifier 721-2 converts the amplitude level of a rectangular signal as an output signal into a specified value without depending on the amplitude level of an input rectangular signal. The limiter amplifier 721-2 then outputs the converted rectangular signal to the combiner 121.

The combiner 121 combines the electrical signal transmitted from the limiter amplifier 721-1 and the electrical signal transmitted from the limiter amplifier 721-2. The combiner 121 then outputs the combined signal to the mixer circuit 123.

The details of the limiter amplifier 721-1 and the limiter amplifier 721-2 are described hereinafter.

The amplitude values of the rectangular outphasing signals S1 and S2 output from the transmission device 100 can vary due to signal deterioration on the way through the optical fiber module until being input to the remote unit even if they are ideally output having the same level of amplitude. When the amplitude values of S1($t$) and S2($t$) become a times and b times larger, respectively, until they reach the combiner 121 in the remote unit, the output Scomb(t) of the combiner is defined by the following equation (17). Further, the output Scomb_ideal(t) of the combiner when an input signal is ideal (a=b=1) is defined by the following equation (18).

$$Scomb(t) = \qquad (17)$$
$$a \cdot S1(t) + b \cdot S2(t) = a \cdot (S1(t) + S2(t)) - (a - b) \cdot S2(t) =$$
$$a \cdot Scomb\_ideal(t) - (a - b) \cdot S2(t)$$

$$Scomb\_ideal(t) = \qquad (18)$$
$$OP1(t) + OP2(t) + Rec(OP1(t)) + Rec(OP2(t))$$

As is obvious from the equation (17), when a and b are not equal, the signal S2($t$) leaks to the output of the combiner 121. In other words, S2($t$) is emitted from the antenna 125 of the remote unit. This means that an undesired signal is emitted, and the signal-to-noise power ratio of a high-frequency radio signal is degraded.

As described above, in the remote unit according to the third example embodiment, the amplitude levels of the outputs of the limiter amplifier 721-1 and the limiter amplifier 721-2 are the same, and therefore the amplitude levels of the rectangular signals S1 and S2 are the same at the input point of the combiner 121. Specifically, ideally, a=b is satisfied, and the above-described undesired wave S2($t$) does not leak. Further, even when a and b are not completely the same, the level of the undesired wave S2($t$) becomes smaller. This enables significant reduction of the degradation of the signal-to-noise power ratio of a high-frequency radio signal.

Fourth Example Embodiment

Figure 8:
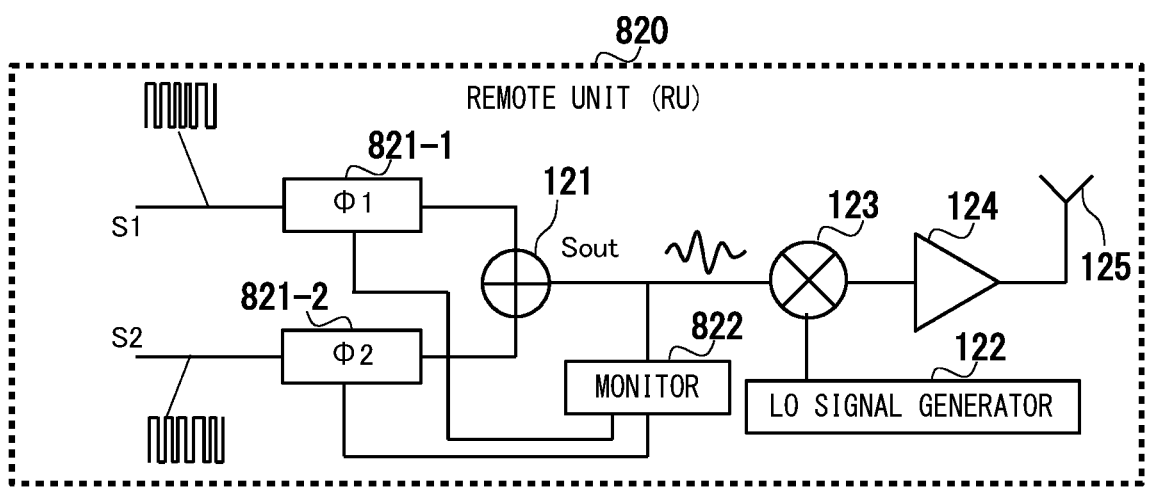
FIG. 8 is a block diagram showing an example of a remote unit according to a fourth example embodiment.

In a fourth example embodiment, an example of the remote unit of the optical wireless transmission system according to the first or second example embodiment is described. FIG. 8 is a block diagram showing an example of a remote unit according to the fourth example embodiment. In FIG. 8, a remote unit 820 includes a delay unit 821-1, a delay unit 821-2, a monitor 822, a combiner 121, an LO signal generator 122, a mixer circuit 123, a power amplifier 124, and an antenna 125.

The delay unit 821-1 delays the electrical signal transmitted from the O/E converter 113-1 by the amount of delay indicated by the monitor 822 and then outputs the signal to the combiner 121.

Likewise, the delay unit 821-2 delays the electrical signal transmitted from the O/E converter 113-2 by the amount of delay indicated by the monitor 822 and then outputs the signal to the combiner 121.

The monitor 822 calculates the amount of delay to be indicated for each of the delay units 821-1 and 821-2 based on the distortion component of the electrical signal combined in the combiner 121. The monitor 822 then gives an indication of the corresponding amount of delay to the delay unit 821-1 and the delay unit 821-2.

The combiner 121 combines the electrical signal output from the delay unit 821-1 and the electrical signal output from the delay unit 821-2. The combiner 121 then outputs the combined signal to the LO signal generator 122 and the monitor 822.

Figure 9:
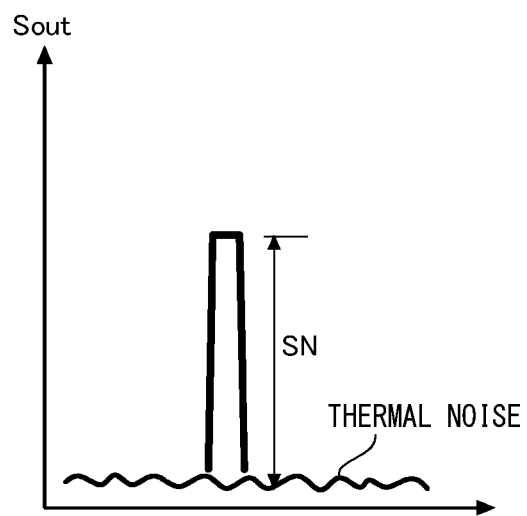
FIG. 9 is a graph showing an example of an output spectrum of a combiner 121.
Figure 10:
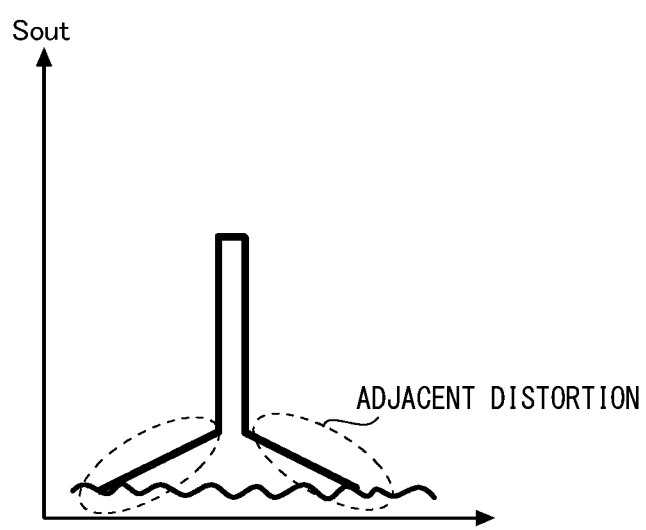
FIG. 10 is a graph showing an example of an output spectrum of the combiner 121.

The detailed operation of the remote unit 820 is described hereinafter. FIGS. 9 and 10 are graphs showing an example of the output spectrum of the combiner 121. In FIGS. 9 and 10, the vertical axis indicates the strength of the output signal of the combiner 121, and the horizontal axis indicates the frequency.

When the two rectangular outphasing signals S1 and S2 output from the transmission device 100 are input to the combiner 121 at the same timing, the output signal of the combiner 121 has a desired spectrum. FIG. 9 shows this spectrum near the intermediate frequency. On the other hand, when the timing of S1 and S2 is not the same, a distortion component with skirt characteristics that spreads widely from near the desired spectrum occurs as shown in FIG. 10. This distortion component is more significant as a difference in timing between S1 and S2 is larger. The monitor 822 has a function of detecting the strength of this distortion component.

Figure 11:
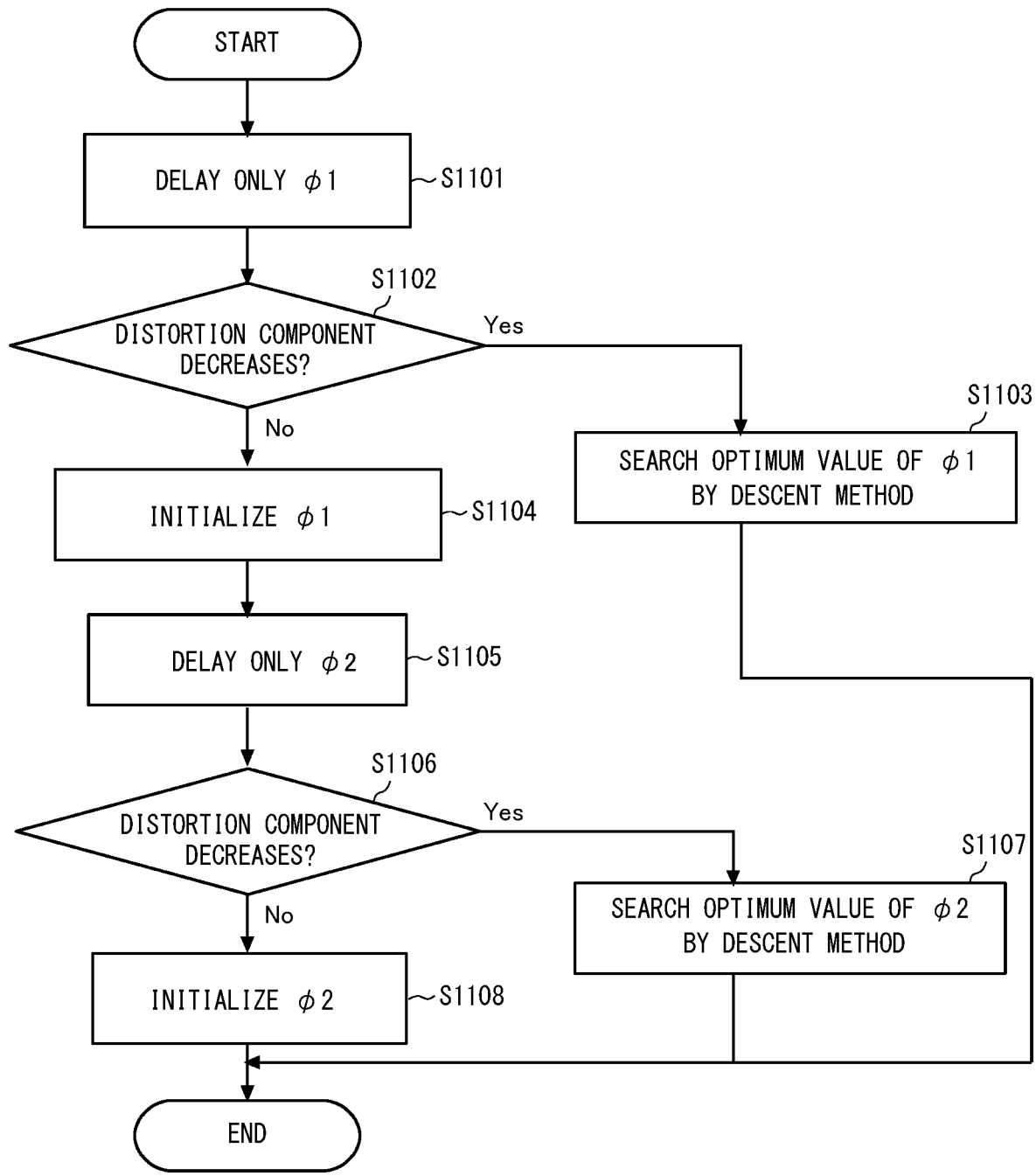
FIG. 11 is a flowchart showing an example of the operation of the remote unit according to the fourth example embodiment.

A method of controlling the amount of delay in the fourth example embodiment is described hereinafter with reference to a flowchart. FIG. 11 is a flowchart showing an example of the operation of the remote unit according to the fourth example embodiment. In FIG. 11, the delay unit 821-1 that adjusts the amount of delay for S1 is denoted by φ1, and the delay unit 821-2 that adjusts the amount of delay for S2 is denoted by φ2.

First, in Step S1101, the amount of delay is applied to φ1, and the process proceeds to Step S1102.

Next, in Step S1102, the monitor 822 monitors whether the distortion component decreases or not. When the distortion component decreases in Step S1102, the process proceeds to Step S1103. On the other hand, when the distortion component does not decrease, the process proceeds to Step S1104.

In Step S1103, the amount of delay for φ1 that minimizes the distortion component is searched using the descent method, and then the amount of delay is fixed to this value, and the operation ends.

In Step S1104, the amount of delay for φ1 is initialized, and the process proceeds to Step S1105.

In Step S1105, only φ2 is delayed, and the process proceeds to Step S1106.

In Step S1106, the monitor 822 monitors whether the distortion component decreases or not. When the distortion component decreases in Step S1106, the process proceeds to Step S1107. On the other hand, when the distortion component does not decrease, the process proceeds to Step S1108.

In Step S1107, the amount of delay for φ2 that minimizes the distortion component is searched using the descent method, and then the amount of delay is fixed to this value, and the operation ends.

In Step S1108, the amount of delay for φ2 is initialized, and the operation ends.

As described above, in the remote unit according to the fourth example embodiment, by adjusting the amount of delay of signals, the timing of the signals is aligned at the input point of the combiner. This can suppress the deterioration of the signal-to-distortion power ratio caused by a difference in timing.

Fifth Example Embodiment

Figure 12:
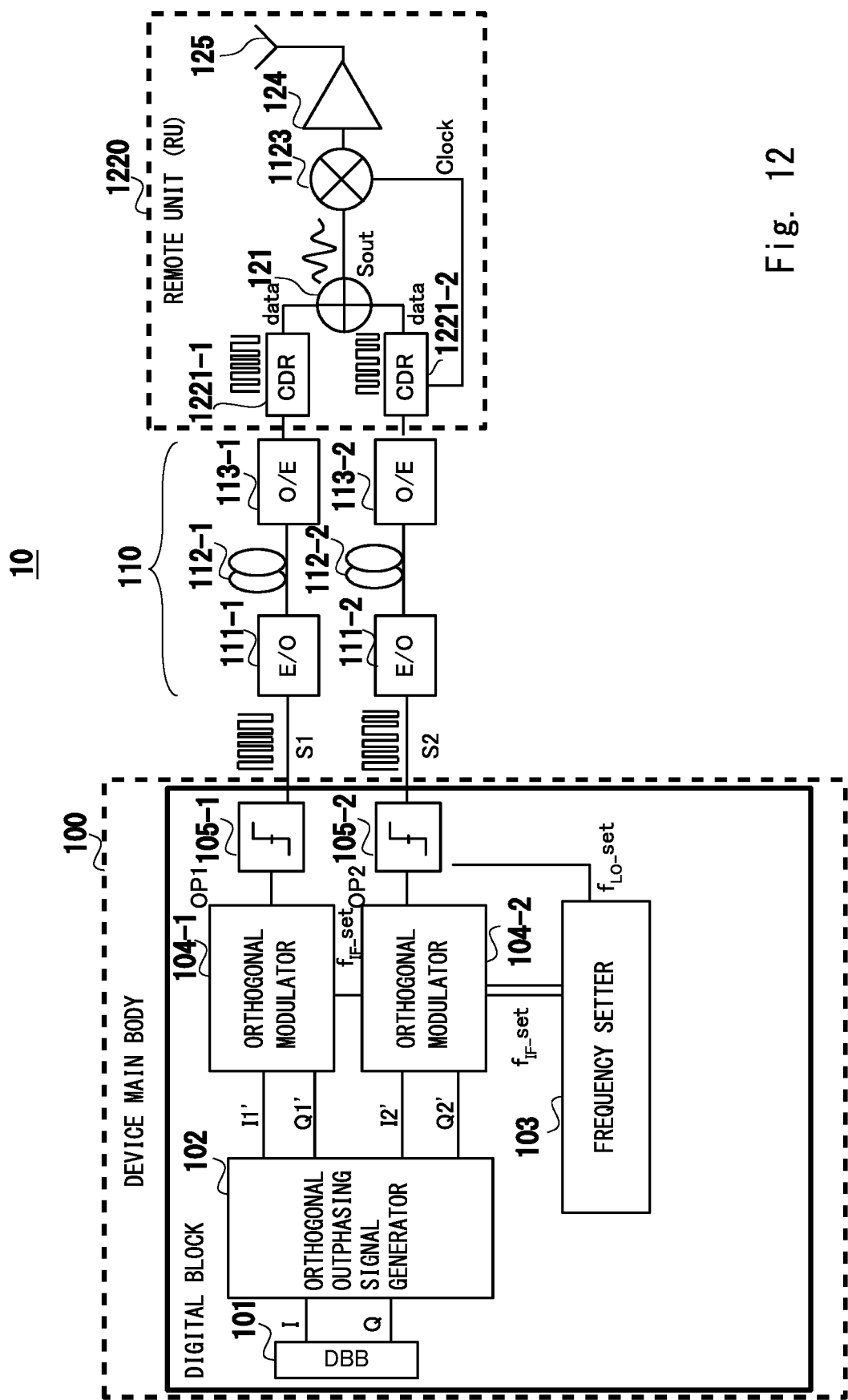
FIG. 12 is a block diagram showing an example of a remote unit according to a fifth example embodiment.

FIG. 12 is a block diagram showing an example of a remote unit according to a fifth example embodiment. In FIG. 12, a remote unit 1220 includes a CDR 1221-1, a CDR 1221-2, a combiner 121, a mixer circuit 1123, a power amplifier 124, and an antenna 125.

The CDR 1221-1 and the CDR 1221-2 are CDR (clock data recovery) circuits that extract a clock signal from an electrical signal (data signal) synchronized with a clock. The CDR 1221-1 then outputs the clock signal to the mixer circuit 1123. Further, the CDR 1221-1 outputs an electrical signal output from the O/E converter 113-1 to the combiner 121. Likewise, the CDR 1221-2 outputs an electrical signal output from the O/E converter 113-2 to the combiner 121.

The combiner 121 combines the electrical signal output from the CDR 1221-1 and the electrical signal output from the CDR 1221-2. The combiner 121 then outputs the combined signal to the mixer circuit 1123.

The mixer circuit 1123 mixes the clock signal with the signal combined by the combiner 121 and thereby performs frequency conversion. The mixer circuit 1123 then outputs the frequency-converted signal to the power amplifier 124.

In the remote unit according to the fifth example embodiment, when the intermediate frequency that is used for the rectangular signals S1 and S2 output from the transmission device is $f_{IF}$ and the clock signal is $f_{CLK}$, the frequency of the output signal of the mixer circuit is the sum of, or a difference between, $f_{IF}$ and $f_{CLK}$.

As described above, because the remote unit according to the fifth example embodiment does not include an LO signal generator, size and cost reduction of the remote unit is achieved compared with the remote unit according to the first example embodiment.

Sixth Example Embodiment

Figure 13:
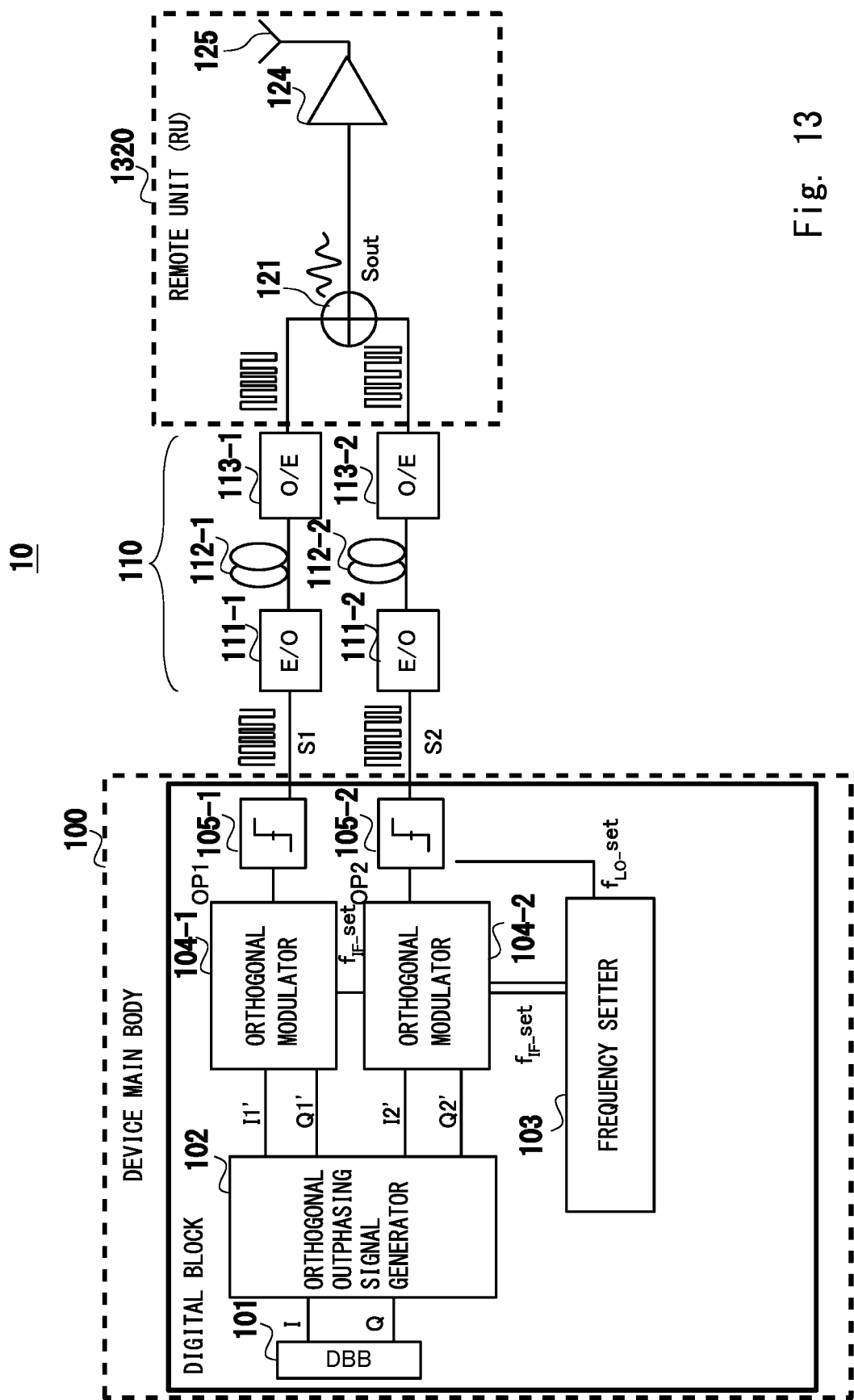
FIG. 13 is a block diagram showing an example of a remote unit according to a sixth example embodiment.

FIG. 13 is a block diagram showing an example of a remote unit according to a sixth example embodiment. In FIG. 13, a remote unit 1320 includes a combiner 121, a power amplifier 124, and an antenna 125.

The combiner 121 combines the electrical signal transmitted from the O/E converter 113-1 and the electrical signal transmitted from the O/E converter 113-2. The combiner 121 then outputs the combined signal to the power amplifier 124.

The power amplifier 124 amplifies the signal combined in the combiner 121. The power amplifier 124 then outputs the amplified signal to the antenna 125.

The antenna 125 emits the output of the power amplifier 124 as a radio wave in the air. Thus, the radio signal emitted from the antenna 125 corresponds to the intermediate frequency that is used for the rectangular outphasing signals S1 and S2.

As described above, because the remote unit according to the sixth example embodiment does not include an LO signal generator and a mixer circuit, size and cost reduction of the remote unit is achieved compared with the remote unit according to the first example embodiment.

Note that the present disclosure is not limited to the above-described example embodiments and can be modified as appropriate without departing from the spirit and scope of the present disclosure. For example, the first to sixth example embodiments may be implemented by combining the configurations of two or more of any example embodiments as desirable.

Further, elements that are shown in the drawings as functional blocks for performing various kinds of processing may be configured by a CPU, a memory or another circuit as hardware or may be implemented by a program loaded to a memory or the like as software. It would be thus obvious to those skilled in the art that those functional blocks may be implemented in various forms such as hardware only, software only or a combination of those, and not limited to either one.

Figure 14:
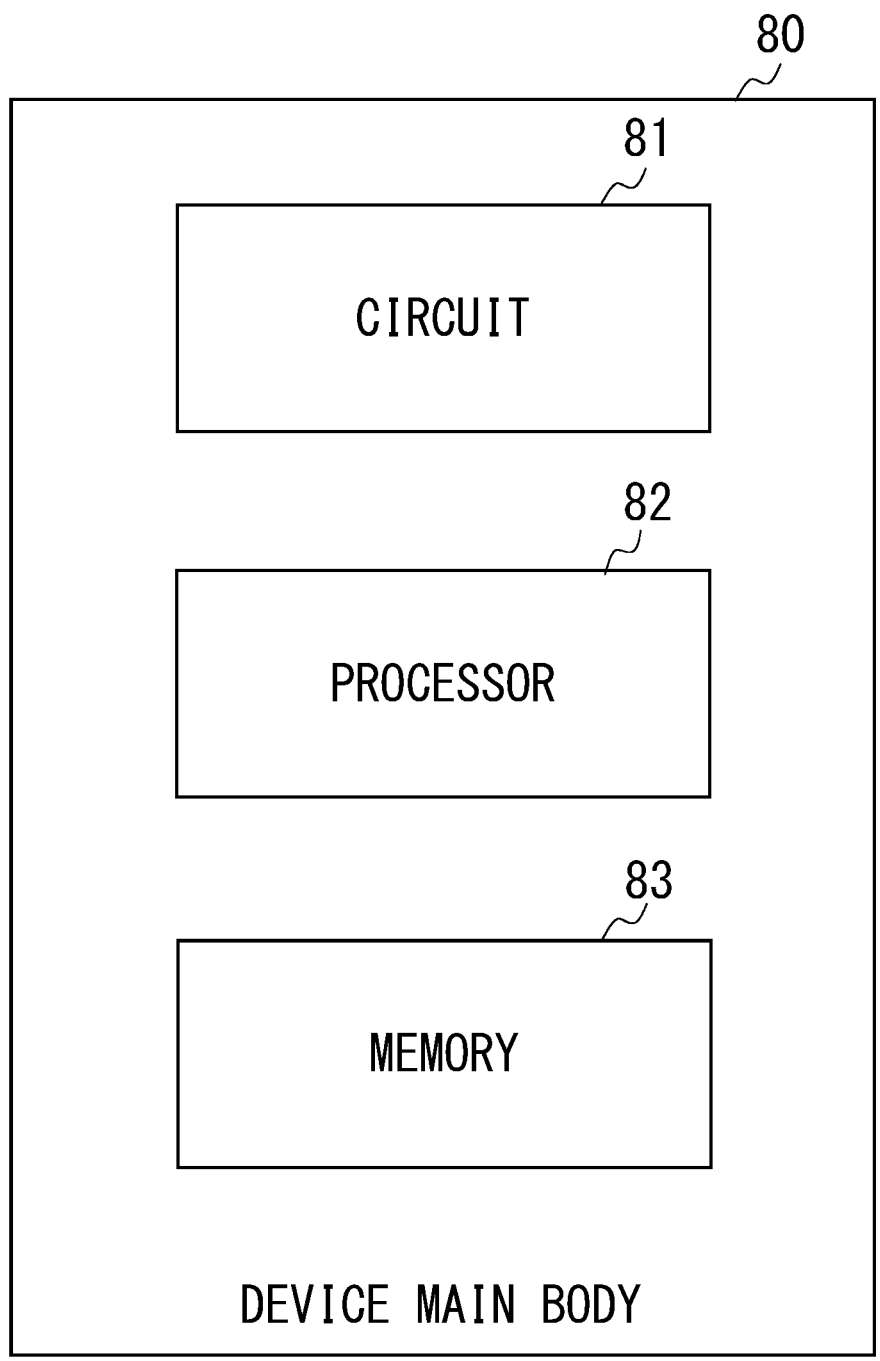
FIG. 14 is a block diagram showing an example of a hardware configuration of a transmission device shown in an arbitrary example embodiment.

FIG. 14 is a block diagram showing an example of a hardware configuration of the transmission device shown in an arbitrary example embodiment. Referring to FIG. 14, a transmission device 80, which is a generic term for the above-described transmission device, includes a circuit 81, a processor 82, and a memory 83.

The circuit 81 is a circuit for processing signals in accordance with the control of the processor 82.

The processor 82 reads the software (computer program) from the memory 83 and executes it to perform the processing of the transmission device described in the above example embodiments. The processor 82 may be, for example, a microprocessor, an MPU (Micro-Processing Unit), a CPU (Central Processing Unit), FPGA (Field-Programmable Gate Array), a DSP (Demand-Side Platform), and an ASIC (Application Specific Integrated Circuit). The processor 82 may include a plurality of these processors.

The memory 83 may include at least one of a volatile memory and a nonvolatile memory. By way of example, the memory 83 comprises a combination of a volatile memory and a nonvolatile memory. The volatile memory may be, for example, a RAM (Dynamic Random-Access Memory) such as a DRAM (Static Random-Access Memory) or an SRAM (random access memory). The nonvolatile memory may be, for example, PROM (programmable ROM), EPROM (Erasable Programmable Read Only Memory), or Flash Memory. The memory 83 may also include storage located away from the processor 82. In this case, the processor 82 may access the memory 83 via an I/O (Input/Output) interface, which is not shown. Note that the number of the memories 83 is not limited to 1, and a plurality of them may be provided.

In the example of FIG. 14, memory 83 is used to store one or more instructions. One or more instructions can be stored as a software module group. The processor 82 reads one or more instructions from the memory 83 and executes them, thereby performing the processing described in the above example embodiments. Examples of the processing performed by the processor 82 are shown in the following Supplementary Notes.

Figure 15:
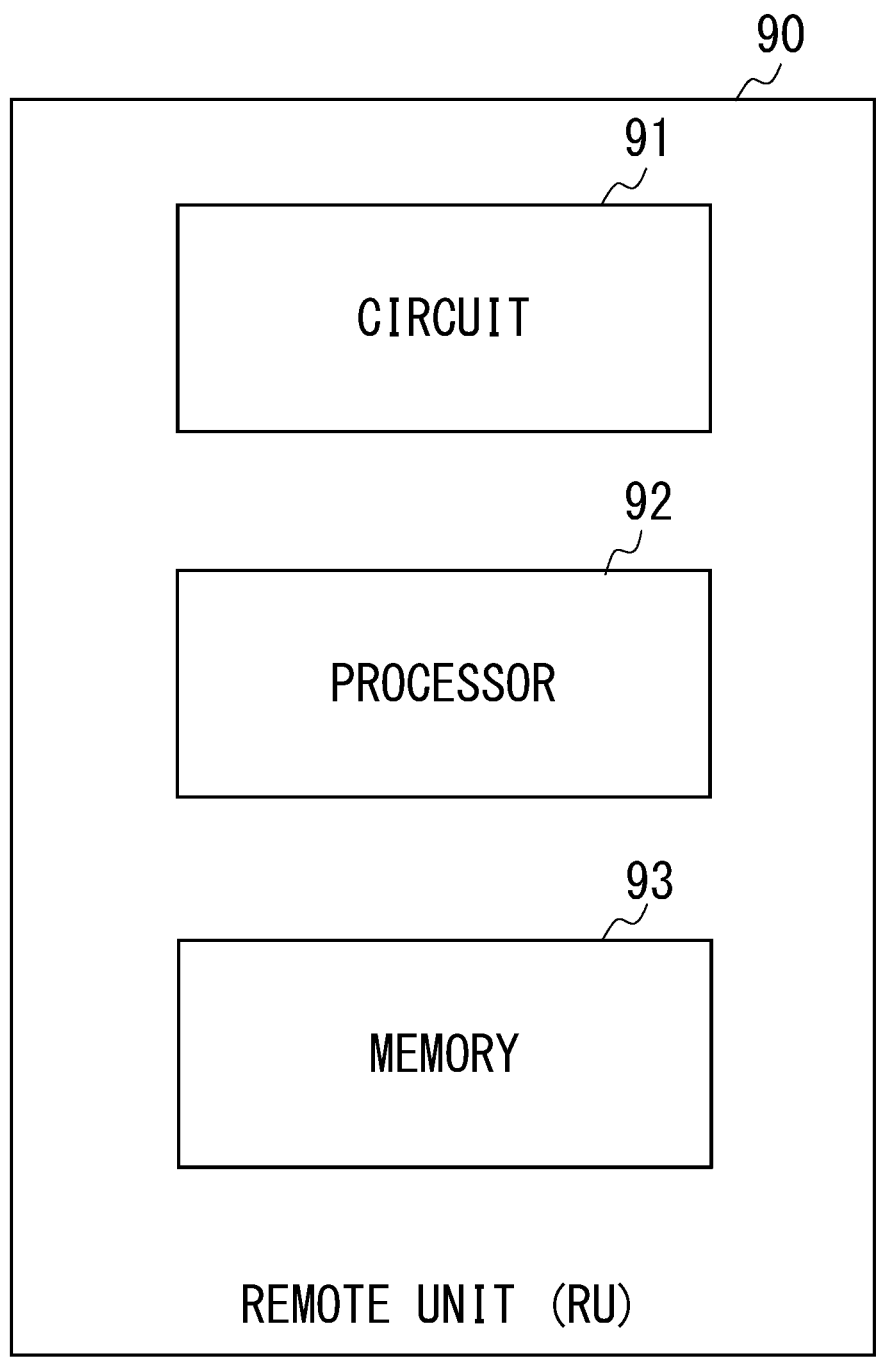
FIG. 15 is a block diagram showing an example of a hardware configuration of the remote unit shown in an arbitrary example embodiment.

FIG. 15 is a block diagram showing an example of a hardware configuration of the remote unit shown in an arbitrary example embodiment. Referring to FIG. 15, a remote unit 90, which is a generic term for the above-described remote unit, includes a circuit 91, a processor 92, and a memory 93.

The circuit 91 is a circuit for processing signals in accordance with the control of the processor 92.

The processor 92 reads the software (computer program) from the memory 83 and executes it to perform the processing of the transmission device described in the above example embodiments. The processor 92 may be, for example, a microprocessor, an MPU, a CPU, FPGA, a DSP, and an ASIC. The processor 92 may include a plurality of these processors.

The memory 93 may include at least one of a volatile memory and a nonvolatile memory. By way of example, the memory 93 comprises a combination of a volatile memory and a nonvolatile memory. The volatile memory may be, for example, a RAM such as a DRAM or an SRAM. The nonvolatile memory may be, for example, PROM, EPROM, or Flash Memory. The memory 93 may also include storage located away from the processor 92. In this case, the processor 92 may access the memory 93 via an I/O interface, which is not shown. Note that the number of the memories 93 is not limited to 1, and a plurality of them may be provided.

In the example of FIG. 15, memory 93 is used to store one or more instructions. One or more instructions can be stored as a software module group. The processor 92 reads one or more instructions from the memory 93 and executes them, thereby performing the processing described in the above example embodiments. Examples of the processing performed by the processor 92 are shown in the following Supplementary Notes.

In addition, the optical fiber module in the above-described embodiment may also be composed of a circuit, a processor, and a memory for performing the same processing as those in FIGS. 14 and 15.

As described above, one or more processors of each device in the above-described embodiments execute one or more programs including one or more instructions for causing a computer to perform the algorithms described using the drawings. By this processing, the signal processing method described in each embodiment can be realized.

Further, the above-described program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Part of or all the foregoing embodiments can be described as in the following appendixes, but the present disclosure is not limited thereto.

(Supplementary Note 1)

An optical wireless transmission system comprising:

a transmission device including at least one memory storing instructions, and at least one processor configured to execute the instructions to;

generate a plurality of digital outphasing signals;

orthogonally modulate the digital outphasing signals at an intermediate frequency; and set an intermediate frequency for satisfying a specified signal-to-distortion power ratio based on a sampling frequency, wherein the digital outphasing signals are orthogonally modulated at the intermediate frequency;

a hardware optical fiber module configured to convert orthogonally modulated digital electrical signals into optical signals, transmit the optical signals through an optical fiber, and convert the optical signals into digital electrical signals; and a remote unit configured to combine the digital electrical signals transmitted by the hardware optical fiber module, and transmit a combined signal as a radio signal.

(Supplementary Note 2)

The optical wireless transmission system according to Supplementary Note 1, wherein the hardware optical fiber module performs wavelength-division multiplexing on a plurality of orthogonally modulated digital electrical signals, and transmits the signals through an optical fiber.

(Supplementary Note 3)

The optical wireless transmission system according to Supplementary Note 1, wherein the remote unit converts an amplitude level of the digital electrical signals transmitted by the hardware optical fiber module into a specified value, combines converted digital electrical signals, and transmits a combined signal as a radio signal.

(Supplementary Note 4)

The optical wireless transmission system according to Supplementary Note 3, wherein the at least one processor of the transmission device is further configured to execute the instructions to;
 give, to the remote unit, an indication of an LO frequency obtained by adding or subtracting the intermediate frequency to or from a frequency of the radio signal; and
 the remote unit includes:
 a limiter amplifier configured to convert an amplitude level of the digital electrical signals transmitted by the hardware optical fiber module into a specified value;
 a combiner configured to combine converted digital electrical signals;
 an LO signal generator configured to generate a signal with the LO frequency;
 a mixer configured to mix the signal with the LO frequency with a combined signal; and
 an antenna configured to transmit a mixed signal as a radio signal.

(Supplementary Note 5)

The optical wireless transmission system according to Supplementary Note 1, wherein the remote unit including at least one memory storing instructions, and at least one processor configured to execute the instructions to;
 align timing of the digital electrical signals transmitted by the hardware optical fiber module;
 combine the digital electrical signals with aligned timing; and
 transmit a combined signal as a radio signal.

(Supplementary Note 6)

The optical wireless transmission system according to Supplementary Note 5, wherein the at least one processor of the transmission device is further configured to execute the instructions to;
 give, to the remote unit, an indication of an LO frequency obtained by adding or subtracting the intermediate frequency to or from a frequency of the radio signal; and
 the at least one processor of the remote unit is further configured to execute the instructions to;
 delay the digital electrical signals transmitted by the hardware optical fiber module based on an indication of the delay amount;
 calculate a delay amount for aligning timing of the digital electrical signals and give the indication of the delay amount;
 combine the digital electrical signals with aligned timing;
 generate a signal with the LO frequency;
 mix the signal with the LO frequency with a combined signal;
 transmit a mixed signal as a radio signal, and
 calculate a delay amount based on a combined signal.

(Supplementary Note 7)

The optical wireless transmission system according to Supplementary Note 1, wherein the remote extracts a clock signal from the digital electrical signals transmitted by the hardware optical fiber module, combines the digital electrical signals, mixes the clock signal with a combined signal, and transmits a mixed signal as a radio signal.

(Supplementary Note 8)

The optical wireless transmission system according to Supplementary Note 7, wherein the remote unit includes:
 a CDR configured to extract a clock signal from the digital electrical signals transmitted by the hardware optical fiber module;
 a combiner configured to combine the digital electrical signals;
 a mixer configured to mix the clock signal with a combined signal; and
 an antenna configured to transmit a mixed signal as a radio signal.

(Supplementary Note 9)

A transmission device including at least one memory storing instructions, and at least one processor configured to execute the instructions to;
 generate a plurality of digital outphasing signals;
 orthogonally modulate the digital outphasing signals at an intermediate frequency; and
 set an intermediate frequency for satisfying a specified signal-to-distortion power ratio based on a sampling frequency, wherein the digital outphasing signals are orthogonally modulated at the intermediate frequency.

(Supplementary Note 10)

The transmission device according to Supplementary Note 9, wherein the at least one processor of the transmission device is further configured to execute the instructions to;
 give, to a remote unit, an indication of an LO frequency obtained by adding or subtracting the intermediate frequency to or from a frequency of the radio signal.

(Supplementary Note 11)

An optical wireless transmission method comprising:
 generating a plurality of digital outphasing signals;
 orthogonally modulating the digital outphasing signals at an intermediate frequency;
 setting an intermediate frequency for satisfying a specified signal-to-distortion power ratio based on a sampling frequency, wherein the orthogonal modulation orthogonally modulates the digital outphasing signals at the set intermediate frequency;
 converting orthogonally modulated digital electrical signals into optical signals, transmitting the optical signals through an optical fiber, and converting the optical signals into digital electrical signals; and
 combining the transmitted digital electrical signals and transmitting a combined signal as a radio signal.

(Supplementary Note 12)

A signal processing method comprising:
 generating a plurality of digital outphasing signals;
 orthogonally modulating the digital outphasing signals at an intermediate frequency; and
 setting an intermediate frequency for satisfying a specified signal-to-distortion power ratio based on a sampling frequency, wherein the orthogonal modulation orthogonally modulates the digital outphasing signals at the set intermediate frequency.

(Supplementary Note 13)

A non-transitory computer readable medium storing a program causing a computer to perform a method of:

generating a plurality of digital outphasing signals;
orthogonally modulating the digital outphasing signals at an intermediate frequency; and
setting an intermediate frequency for satisfying a specified signal-to-distortion power ratio based on a sampling frequency, wherein the orthogonal modulation orthogonally modulates the digital outphasing signals at the set intermediate frequency.

What is claimed is:

1. An optical wireless transmission system comprising:
   a transmission device including at least one memory storing instructions, and at least one processor configured to execute the instructions to;
      generate a plurality of digital outphasing signals;
      orthogonally modulate the digital outphasing signals at an intermediate frequency;
      convert the digital outphasing signals, which have been orthogonally modulated, into rectangular shapes using a rectangulating unit; and
      set, based on a table of parameters and a signal-to-distortion power ratio stored in the memory, an intermediate frequency at which signal-to-distortion power ratios in the rectangularized digital outphasing signals are equal to or greater than a predetermined value for distortion components of the rectangularized digital outphasing signals generated by the rectangulating unit;
   a hardware optical fiber module configured to convert rectangularized digital electrical signals into optical signals, transmit the optical signals through an optical fiber, and convert the optical signals into digital electrical signals; and
   a remote unit configured to combine the digital electrical signals transmitted by the hardware optical fiber module, and transmit a combined signal as a radio signal.

2. The optical wireless transmission system according to claim 1, wherein the hardware optical fiber module is configured to perform wavelength-division multiplexing on a plurality of orthogonally modulated digital electrical signals, and transmit the signals through an optical fiber.

3. The optical wireless transmission system according to claim 1, wherein the remote unit is configured to convert an amplitude level of the digital electrical signals transmitted by the hardware optical fiber module into a specified value, combine converted digital electrical signals, and transmit a combined signal as a radio signal.

4. The optical wireless transmission system according to claim 3, wherein the at least one processor of the transmission device is further configured to execute the instructions to:
   give, to the remote unit, an indication of an LO frequency obtained by adding or subtracting the intermediate frequency to or from a frequency of the radio signal; and
   wherein the remote unit includes:
      a limiter amplifier configured to convert an amplitude level of the digital electrical signals transmitted by the hardware optical fiber module into a specified value;
      a combiner configured to combine converted digital electrical signals;
      an LO signal generator configured to generate a signal with the LO frequency;
      a mixer configured to mix the signal with the LO frequency with a combined signal; and
      an antenna configured to transmit a mixed signal as a radio signal.

5. The optical wireless transmission system according to claim 1, wherein the remote unit includes at least one memory storing instructions, and at least one processor configured to execute the instructions to:
   align timing of the digital electrical signals transmitted by the hardware optical fiber module;
   combine the digital electrical signals with aligned timing; and
   transmit a combined signal as a radio signal.

6. The optical wireless transmission system according to claim 5, wherein the at least one processor of the transmission device is further configured to execute the instructions to:
   give, to the remote unit, an indication of an LO frequency obtained by adding or subtracting the intermediate frequency to or from a frequency of the radio signal; and
   wherein the at least one processor of the remote unit is further configured to execute the instructions to:
      delay the digital electrical signals transmitted by the hardware optical fiber module based on an indication of the delay amount;
      calculate a delay amount for aligning timing of the digital electrical signals and give the indication of the delay amount;
      combine the digital electrical signals with aligned timing;
      generate a signal with the LO frequency;
      mix the signal with the LO frequency with a combined signal;
      transmit a mixed signal as a radio signal; and
      calculate a delay amount based on a combined signal.

7. The optical wireless transmission system according to claim 1, wherein the remote unit is configured to extract a clock signal from the digital electrical signals transmitted by the hardware optical fiber module, combine the digital electrical signals, mix the clock signal with a combined signal, and transmit a mixed signal as a radio signal.

8. The optical wireless transmission system according to claim 7, wherein the remote unit includes:
   a CDR configured to extract a clock signal from the digital electrical signals transmitted by the hardware optical fiber module;
   a combiner configured to combine the digital electrical signals;
   a mixer configured to mix the clock signal with a combined signal; and
   an antenna configured to transmit a mixed signal as a radio signal.

9. An optical wireless transmission method comprising:
   generating a plurality of digital outphasing signals;
   orthogonally modulating the digital outphasing signals at an intermediate frequency;
   converting the digital outphasing signals, which have been orthogonally modulated, into rectangular shapes using a rectangulating unit;
   setting, based on a table of parameters and a signal-to-distortion power ratio stored in the memory, an intermediate frequency at which signal-to-distortion power ratios in the rectangularized digital outphasing signals are equal to or greater than a predetermined value for distortion components of the rectangularized digital outphasing signals generated by the rectangulating unit;
   converting rectangularized digital electrical signals into optical signals, transmitting the optical signals through an optical fiber, and converting the optical signals into digital electrical signals; and combining the transmitted digital electrical signals and transmitting a combined signal as a radio signal.

10. A non-transitory computer readable medium storing a program, which if executed, causes a computer to perform a method comprising:

generating a plurality of digital outphasing signals;

orthogonally modulating the digital outphasing signals at an intermediate frequency;

converting the digital outphasing signals, which have been orthogonally modulated, into rectangular shapes using a rectangulating unit; and setting, based on a table of parameters and a signal-to-distortion power ratio stored in the memory, an intermediate frequency at which signal-to-distortion power ratios in the rectangularized digital outphasing signals are equal to or greater than a predetermined value for distortion components of the rectangularized digital outphasing signals generated by the rectangulating unit.

* * * * *